June 24, 1930.   O. G. SIMMONS   1,765,853
WORM GENERATING HOB
Filed Aug. 27, 1927   3 Sheets-Sheet 1

INVENTOR

June 24, 1930.   O. G. SIMMONS   1,765,853
WORM GENERATING HOB
Filed Aug. 27, 1927   3 Sheets-Sheet 2

INVENTOR

June 24, 1930.   O. G. SIMMONS   1,765,853
WORM GENERATING HOB
Filed Aug. 27, 1927   3 Sheets-Sheet 3
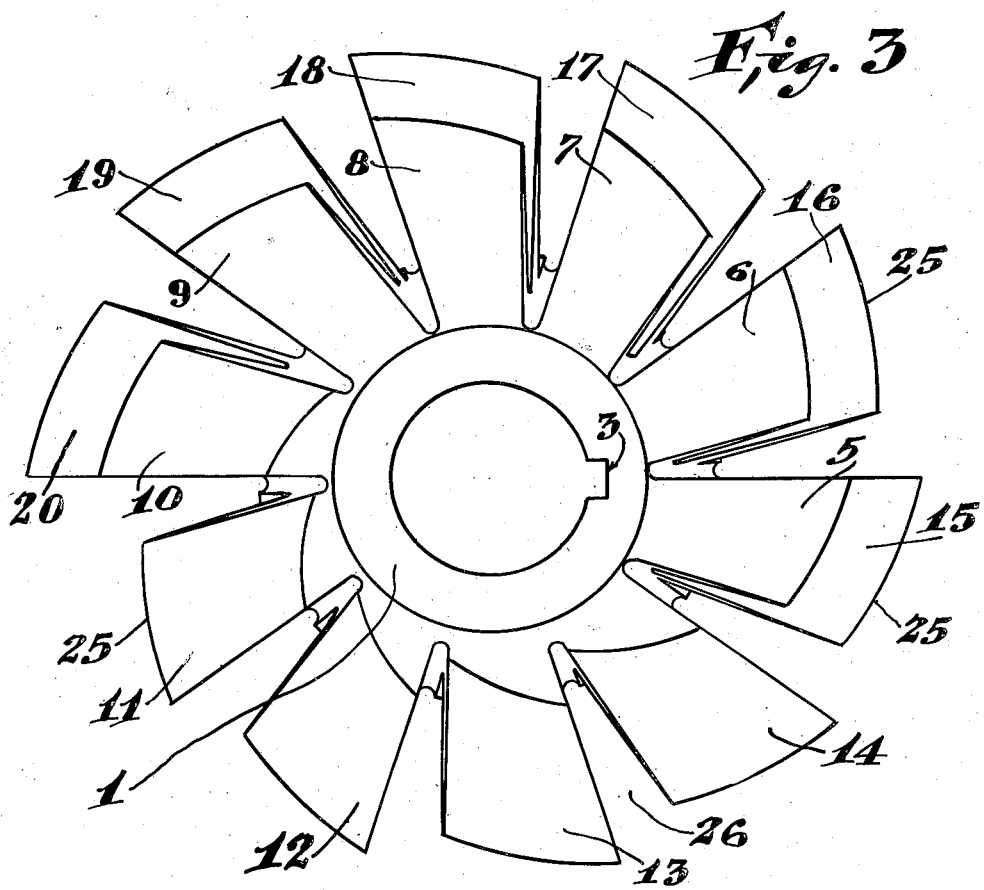
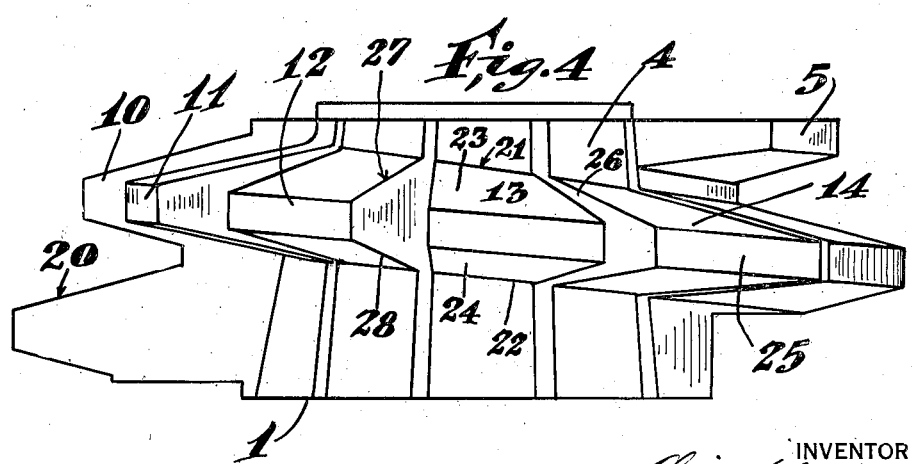
INVENTOR Patented June 24, 1930

1,765,853

UNITED STATES PATENT OFFICE

OLIVER G. SIMMONS, OF LAKEWOOD, OHIO, ASSIGNOR TO THE NATIONAL TOOL COMPANY, OF CLEVELAND, OHIO, A CORPORATION OF OHIO

WORM GENERATING HOB

Application filed August 27, 1927. Serial No. 215,970.

This invention relates to a worm generating hob designed to generate a worm having teeth of suitable contour for use in gearing or for making a hob having a tooth contour suitable for generating a worm gear.

The present invention has for an object to provide a hob in which successive teeth cut to increasing depth and width into a worm blank and in which the final or finishing tooth is formed to accurately generate the opposite faces of adjacent worm teeth and further to provide a hob in which the teeth make substantially parallel cuts in the blank, each slightly deeper and wider than that of the preceding tooth, so that the groove or grooves in the blank are gradually and uniformly enlarged to the correct width, depth and contour.

A further object of the invention is to provide a hob having its teeth arranged in a helicoidal spiral curve and in which the opposite side faces of the teeth lie in surfaces of revolution which may be generated by means of a cutting element, which during the cutting operation has relative angular and translative movements with respect to the blank, the relative angular and translative movements being such as may be readily produced by mechanisms such as are well known to those skilled in the art for imparting suitably correlated rotary and linear movements.

A further object of the invention is to provide a hob in which the teeth are all of substantially the same size and shape and so formed as to have ample strength to withstand the stresses to which they are subjected in use.

In order to provide proper rolling contact between worm teeth and worm gear teeth throughout the width of the worm gear, it is essential that each tooth face of the worm conform to a surface of revolution which, within the confines of the tooth surfaces, intersects cylindrical surfaces coaxial with the worm along helices having the same longitudinal lead. If this condition be fulfilled, the contours of the worm teeth are uniform in axial planes and in planes parallel with the axis and at given distances therefrom, and, when the worm is rotating the lines of intersection of a tooth face with planes parallel with the axis, all advance in said planes at the same rate so that the worm teeth may coact with teeth of a properly generated worm gear in the manner of a rack with a gear.

The present invention has for an important object to provide a generated hob in which the generating cutting edges are so disposed that they will produce truly helical worm teeth of the desired uniform contour in axial planes and in which the generating cutting edges simultaneously cut opposed tooth faces to accurately conform to helical surfaces of revolution.

A further object is to provide a worm generating hob which can be sharpened by grinding away the front faces of the teeth without affecting the form of worm teeth generated by the hob.

With the above and other objects in view, the invention may be said to comprise the hob as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification in which Fig. 1 is a perspective view showing the hob operating upon a worm blank.

Fig. 3 is an end elevation of the hob.

Fig. 4 is a plan view of the hob.

Figure 1:
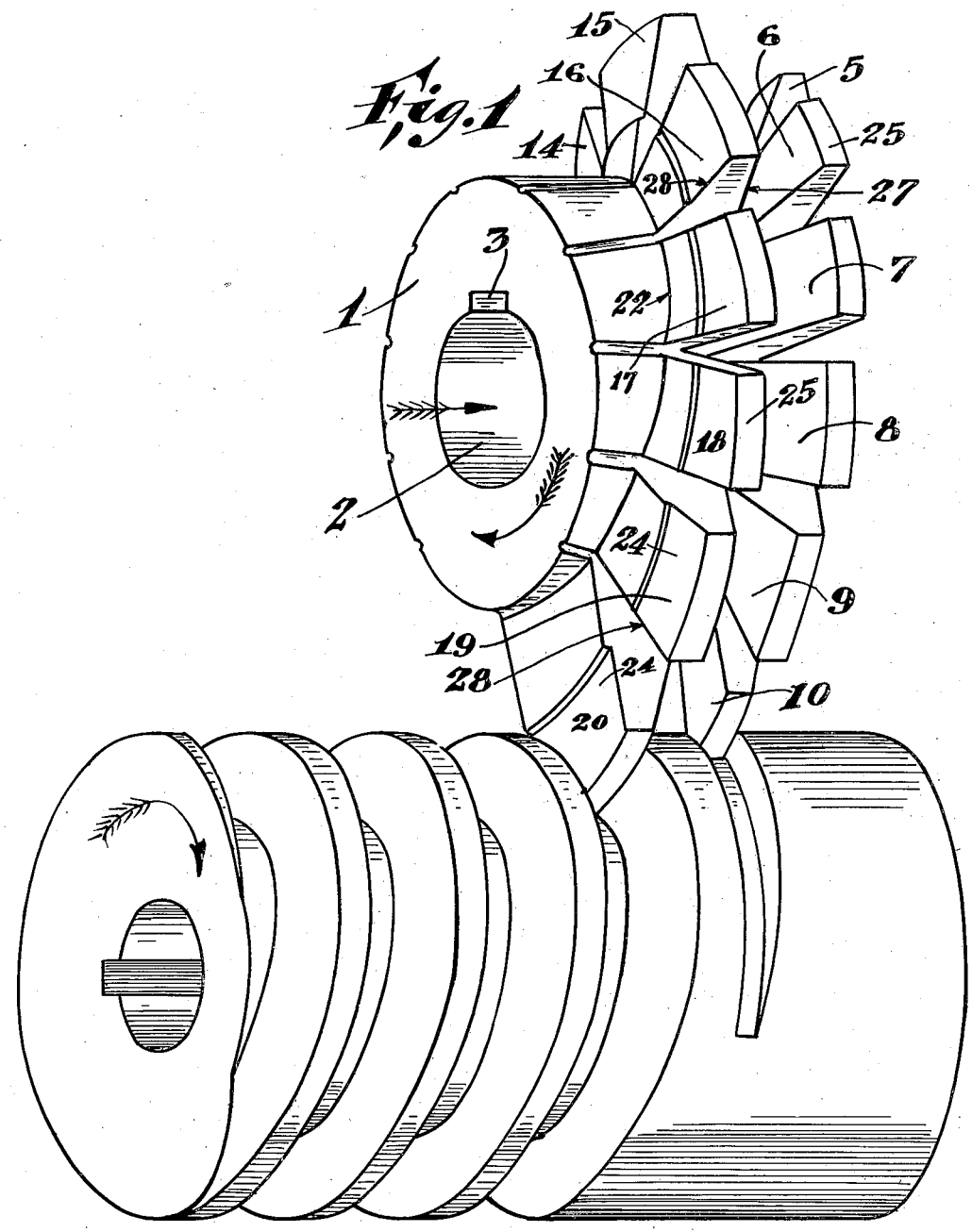

Referring to the accompanying drawings, the hob is formed upon the hub 1, which is provided with an axial bore 2 having a keyway 3, formed therein so that the hob may be fixed to the hob spindle of a suitable hobbing machine. In cutting the hob teeth, the end 4 of the hub is reduced to tapered form as clearly shown in Fig. 4 of the drawing. The cutting teeth of the hob which are numbered from 5 to 20 in the drawing extend around the axis of the hob in a helicoidal spiral curve which has a uniform lead longitudinally of the axis and also a uniform rate of advance or lead laterally of said axis. A cutting tooth 5 is located at the forward end of the helicoidal spiral row of teeth and from the tooth 5 to the tooth 20, the distance of the teeth from the axis of the hob gradually increases due to the lateral lead of the helicoidal spiral curve followed by the teeth. For instance, the root or base lines of the hob teeth which are indicated at 21 and 22 in Fig. 4 of the drawing, lie on the surface of a cone and are helicoidal spiral curves such as would be generated on the conical surface if the cone were revolved about its axis at a uniform angular speed and a point on its surface were moved in a radial plane along the cone surface at a uniform rate, the taper of the cone giving the point a uniform rate of advance or lead laterally of the axis, as it is moved longitudinally thereof.

Figure 2:
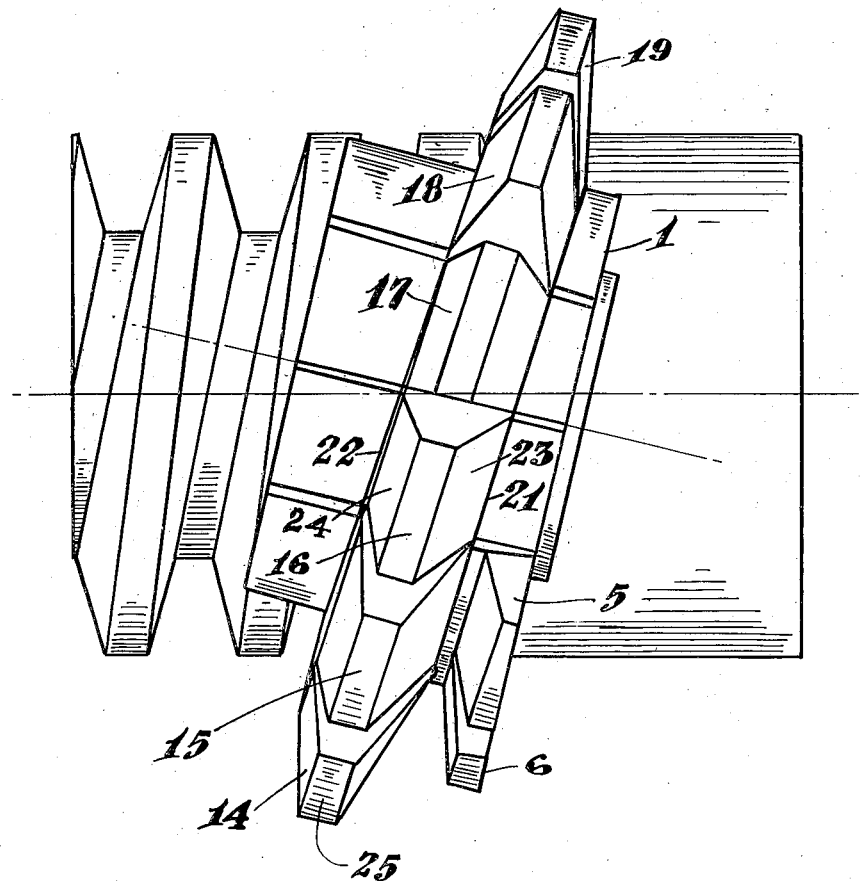
Fig. 2 is a top plan view of the hob and worm blank.

The teeth of the hob are in the form of segments of a helicoidal spiral worm tooth, the cross-sectional contour of which is uniform in radial planes, each face of the worm tooth coinciding with surfaces of revolution formed by a linear generatrix lying in an axial plane and moving about said axis without movement other than that of translation with respect to its axial plane along a helicoidal spiral surrounding the axis and having a uniform lead longitudinally of the axis and laterally with respect thereto. The form of the radial generatrix of the tooth surface determines the contour of the generated worm teeth in an axial plane and may be easily ascertained for a given form of worm tooth which it is desired to generate with the hob. As shown in Figs. 2 and 4, the opposite faces of the hob teeth conform to a surface of revolution in which the helicoidal spiral root curves 21 and 22 lie, the opposite faces 23 and 24 of the teeth being generated outwardly of the root lines by a generatrix passing through the axis and root curve. The outer edges 25 of the teeth are relieved to provide proper cutting clearance and the teeth are separated by radial gashes 26 providing cutting edges 27 and 28 at the opposite edges of the front faces of the teeth which lie in axial planes, and in the generated surfaces of revolution of the opposite side faces of the teeth. As shown herein, the surfaces of revolution in which the opposite side faces of the hob teeth lie have a straight line generatrix and the cutting edges are therefore straight. The side faces of such a hob may be generated by a cutting tool having a straight cutting edge disposed in an axial plane and having uniform linear movement laterally of the axis of a uniformly rotating hob blank as well as uniform linear movement longitudinally thereof during the cutting operation.

The generatrices of the opposite side faces of the hob teeth are disposed at equal and opposite inclinations with respect to the hob axis so that the cutting edges of the teeth which lie in axial planes have equal and opposite inclinations with respect to the axis, the cutting edges of each tooth being symmetrically disposed with respect to the planes perpendicular to the hob axis. The rates of linear movements of the generatrices of opposite faces of the hob teeth are at such ratios to the angular movements thereof in generating the curves of the opposite sides of the teeth, that the helicoidal spiral curves traced by the generatrices on a given base cone are parallel so that outwardly of this base cone, the hob teeth will be of uniform size and shape in radial cross section. The helicoidal spiral curves on the base cone forming the root lines of the teeth have uniform leads longitudinally of the axis of the hob and laterally thereof. If the helicoidal spiral curves of the side faces of the teeth were continued outwardly to the line of intersection, the line of intersection would also be a helicoidal spiral curve having uniform lead longitudinally of the axis and laterally thereof, the projections of all of the above mentioned helicoidal spiral curves in a plane perpendicular to the axis being Archimedean spirals.

In operation, the short tooth 5 of the hob first engages the forward end of the worm blank and the hob is rotated in the direction to gradually bring the teeth of greater cutting radius into engagement with the blank. The rotation of the blank is in the same direction as that of the hob and the hob is given a feed movement longitudinally of the blank proportional to the rate of angular movement of the blank and corresponding to the lead of the helical curve of the teeth to be generated on the blank. As the successive teeth engage in the groove on the blank, the groove is gradually deepened and widened until it is brought to its final form by the finishing tooth 20.

In generating a worm with the hob, the hob spindle is preferably at an angle to the axis of the blank such that the portions of its thread adjacent the blank extend substantially in the direction of the threads to be cut and at the distance from the blank axis necessary to obtain the desired depth of cut, and with the finishing tooth 20 substantially centered with respect to the blank. The hob is first positioned with the small tooth 5 at the forward end of the blank and with the larger teeth beyond the end of the blank. The hob is then rotated rapidly and the blank turned slowly and advanced with respect to the hob at a rate proportional to its turning movement. Successive teeth of the hob are thus brought into engagement with the blank cutting a groove which is gradually widened and deepened by each successive tooth until the finishing tooth 20 has passed through the groove. As the worm is slowly turned and the hob slowly advanced along the blank in the direction of its axis, each tooth engages successive portions of the blank until the helical teeth extend the desired length along the blank.

What I claim is:

1. A worm generating hob having circumferentially spaced cutting teeth of substantially uniform size and shape in axial cross sectoin and extending around the hob axis in a helicoidal spiral curve, each tooth having its cutting edges lying in an axial plane and at opposite and substantially equal inclinations with respect to a plane perpendicular to the axis of the hob.

2. A worm generating hob having circumferentially spaced cutting teeth formed by transverse gashes in a helicoidal spiral worm thread, each face of which has a contour corresponding to a surface of revolution generated by a straight line generatrix disposed at a fixed angle to an axis of revolution and moving about said axis along a helicoidal spiral path having a uniform lead longitudinally and also laterally with respect to said axis, intersecting generatrices of opposite side faces of the teeth being symmetrically disposed with respect to a plane perpendicular to said axis.

3. A worm generating hob having circumferentially spaced cutting teeth formed by transverse gashes in a helicoidal spiral worm thread, the faces of which have contours corresponding to surfaces of revolution generated by straight line generatrices intersecting an axis of revolution at substantially equal and opposite angles and moving about said axis at fixed angles thereto along helicoidal spiral paths having uniform leads longitudinally and also laterally with respect to said axis.

4. A worm generating hob having circumferentially spaced cutting teeth extending around the axis of the hob in a helicoidal spiral curve, each tooth of the hob having oppositely inclined cutting edges symmetrically disposed with respect to a plane perpendicular to the axis of the hob and lying in a plane axial with respect to the hob, the cutting edges at each side of the teeth lying in helicoidal spiral surfaces.

5. A hob for generating a worm, said hob having circumferentially spaced cutting teeth of substantially uniform size and shape in axial cross section extending around the axis of the hob in a helicoidal spiral curve, the outermost tooth having straight outwardly converging cutting edges on opposite sides thereof disposed at substantially equal and opposite angles with respect to the hob axis, the other teeth of the hob having converging cutting edges which travel in paths parallel with the paths of the cutting edges of the first mentioned tooth at gradually decreasing distances from the axis of rotation.

6. A worm generating hob having circumferentially spaced cutting teeth of substantially uniform size and shape in axial cross section extending around the axis of the hob in a helicoidal spiral curve, the outermost tooth having straight outwardly converging cutting edges on opposite sides thereof, the other teeth of the hob having converging cutting edges which travel in paths parallel with the paths of the cutting edges of the first mentioned tooth at gradually decreasing distances from the axis of rotation, said teeth having relieved peripheral faces which intersect axial planes in lines parallel with the axis of revolution.

In testimony whereof I affix my signature.

OLIVER G. SIMMONS.